US008108135B2

(12) United States Patent
Satoh

(10) Patent No.: US 8,108,135 B2
(45) Date of Patent: Jan. 31, 2012

(54) TRAFFIC CONGESTION DEGREE DETERMINATION DEVICE, TRAFFIC CONGESTION DEGREE NOTIFICATION DEVICE, AND PROGRAM

(75) Inventor: Taichi Satoh, Kariya (JP)

(73) Assignee: Denso Corporation, Kariya (JP)

( * ) Notice: Subject to any disclaimer, the term of this patent is extended or adjusted under 35 U.S.C. 154(b) by 1084 days.

(21) Appl. No.: 12/000,210

(22) Filed: Dec. 11, 2007

(65) Prior Publication Data

US 2008/0162028 A1 Jul. 3, 2008

(30) Foreign Application Priority Data

Dec. 28, 2006 (JP) ................................ 2006-354095

(51) Int. Cl.
*G06F 19/00* (2011.01)

(52) U.S. Cl. ......... 701/118; 701/117; 701/209; 340/905

(58) Field of Classification Search .................. 701/117, 701/118
See application file for complete search history.

(56) References Cited

U.S. PATENT DOCUMENTS 5,164,904 A * 11/1992 Sumner ........................ 701/117
5,173,691 A 12/1992 Sumner
6,006,161 A 12/1999 Katou
6,438,561 B1 * 8/2002 Israni et al. .......................... 1/1
6,574,556 B2 6/2003 Fish et al.
6,633,808 B1 10/2003 Schulz et al.
6,990,407 B1 * 1/2006 Mbekeani et al. ............ 701/117
7,251,560 B2 7/2007 Ogasawara et al.
2004/0049340 A1 3/2004 Usui
2004/0143385 A1 7/2004 Smyth et al.
2004/0249568 A1 * 12/2004 Endo et al. .................... 701/209
2005/0222751 A1 10/2005 Uyeki
2006/0058940 A1 3/2006 Kumagai et al.
2006/0262662 A1 11/2006 Jung et al.
2006/0265118 A1 11/2006 Lee et al.
2006/0268707 A1 11/2006 Lee et al.

(Continued)

FOREIGN PATENT DOCUMENTS

DE 10 2005 060 132 6/2007

(Continued)

OTHER PUBLICATIONS

Combined Search Report and Examination report dated Apr. 15, 2008 in corresponding Great Britain patent application No. GB0725032.7.

(Continued)

*Primary Examiner* — Hussein Elchanti
*Assistant Examiner* — Redhwan k Mawari
(74) *Attorney, Agent, or Firm* — Posz Law Group, PLC

(57) ABSTRACT

When an average vehicle speed corresponding to a congested road section exists and at the same time, speed limit data corresponding to the congested road section is contained in map data, a degree of traffic congestion is determined based on the difference between the average vehicle speed and the speed limit. When an average vehicle speed corresponding to a congested road section exists but speed limit data corresponding to the congested road section is not contained in map data, a degree of traffic congestion is determined based on the average vehicle speed. When there is not information indicating an average vehicle speed corresponding to a congested road section, a degree of traffic congestion indicated in externally received traffic information is directly taken as the result of determination of a degree of traffic congestion.

7 Claims, 4 Drawing Sheets

U.S. PATENT DOCUMENTS

| | | | |
|---|---|---|---|
| 2006/0268721 A1 | 11/2006 | Lee et al. | |
| 2006/0268736 A1 | 11/2006 | Lee et al. | |
| 2006/0268737 A1 | 11/2006 | Lee et al. | |
| 2006/0271285 A1 | 11/2006 | Usui | |
| 2007/0010934 A1 | 1/2007 | Breitenberger et al. | |
| 2007/0019562 A1 | 1/2007 | Kim et al. | |
| 2007/0167172 A1 | 7/2007 | Kim et al. | |
| 2008/0162028 A1* | 7/2008 | Satoh | 701/118 |
| 2009/0125219 A1 | 5/2009 | Lee et al. | |

FOREIGN PATENT DOCUMENTS

| | | | |
|---|---|---|---|
| DE | 10 2006 021 015 | | 11/2007 |
| GB | 2 363 200 | | 12/2001 |
| JP | 04-370900 | A | 12/1992 |
| JP | 07-234989 | A | 9/1995 |
| JP | 2001-289649 | A | 10/2001 |
| JP | 2002-092782 | A | 3/2002 |
| JP | 2003-272089 | A | 9/2003 |
| JP | A-2006-145262 | | 11/2004 |
| JP | 2006-146695 | A | 6/2006 |
| WO | WO 2006/123891 | | 11/2006 |

OTHER PUBLICATIONS

Office Action dated Feb. 1, 2010 from German Patent Office in corresponding German patent application No. 10 2007 062 680.2-31 (and English translation).

Examination Report dated Feb. 26, 2009 in corresponding Great Britain patent application No. 0725032.7.

Office Action dated May 22, 2009 from Great Britain Patent Office in corresponding Great Britain patent application No. GB0725032.7.

* cited by examiner

FIG. 3A

| EVENT LOCATION NO. | LINK NO. |
|---|---|
| 1 | ... |
| 2 | ... |
| ... | ... |
| 1000 | ... |
| 1001 | ... |
| ... | ... |

FIG. 3B

| EVENT NO. | CATEGORY | LEVEL |
|---|---|---|
| 1 | NO TRAFFIC | ... |
| 2 | | ... |
| ... | ... | ... |
| 1001 | CONG. DEGREE | SLOW TRAFFIC |
| 1002 | | HEAVY TRAFFIC |
| 1003 | | ... |
| 1004 | | ... |
| ... | ... | ... |

FIG. 4A

| ROAD CATEGORY | S. LIMIT−AV. SPEED | CONG. DEGREE |
|---|---|---|
| HIGHWAY | $\geqq$ A1km/h | HEAVY TRAFFIC |
| | B1km/h ~ A1km/h | SLOW TRAFFIC |
| | < B1km/h | NO CONG. |
| ORDINARY | $\geqq$ A2km/h | HEAVY TRAFFIC |
| | B2km/h ~ A2km/h | SLOW TRAFFIC |
| | < B2km/h | NO CONG. |

FIG. 4B

| ROAD CATEGORY | S. LIMIT−AV. SPEED | CONG. DEGREE |
|---|---|---|
| HIGHWAY | 0km/h ~ $\alpha$1km/h | HEAVY TRAFFIC |
| | $\alpha$1km/h ~ $\beta$1km/h | SLOW TRAFFIC |
| | $\geqq$ $\beta$1km/h | NO CONG. |
| ORDINARY | 0km/h ~ $\alpha$2km/h | HEAVY TRAFFIC |
| | $\alpha$2km/h ~ $\beta$2km/h | SLOW TRAFFIC |
| | $\geqq$ $\beta$2km/h | NO CONG. |

TRAFFIC CONGESTION DEGREE DETERMINATION DEVICE, TRAFFIC CONGESTION DEGREE NOTIFICATION DEVICE, AND PROGRAM

CROSS REFERENCE TO RELATED APPLICATION

This application is based on and incorporates herein by reference Japanese Patent Application No. 2006-354095 filed on Dec. 28, 2006.

FIELD OF THE INVENTION

The present invention relates to a technology for determining degrees of traffic congestion on roads.

BACKGROUND OF THE INVENTION

As traffic congestion information, the following are provided to vehicle drivers: information about the positions of the forefront and tail end of congested sections, the overall lengths of those sections, a time it takes to go from the tail end to the forefront of each congested section, and the like. These pieces of information are provided through radio broadcasting, sign boards with lamps installed at major highways, automobile navigation systems equipped in vehicles, and the like.

Especially, in recent years, there have been introduced systems so constructed that vehicle sensors or the like for detecting running vehicles are installed on road sides and information obtained from the vehicle sensors is analyzed on the center side to identify a congested section or the like. (An example of such systems is vehicle information and communication system (VICS).) Drivers have come to be able to obtain detailed traffic congestion information, including the position of the forefront and the overall length of each congested section and the like, from these systems.

Patent Document 1: JP-A-10-96649 (corresponding to U.S. Pat. No. 6,006,161)

When accurate traffic congestion information is provided, indeed, this information can be acquired and provided to users as-is. However, only relatively inaccurate traffic congestion information may be provided to users from external traffic information providing centers. In such a case, users' trust in information is relatively degraded. As an example, it is assumed that information indicating the degree of traffic congestion includes three types of "heavy traffic," "slow traffic," and "no congestion" is provided. In this case, the inaccurate information is, for example, such that: though information of "slow traffic" is acquired, the road is in "no congestion" state in actuality.

SUMMARY OF THE INVENTION

It is an object of the present invention to provide a technology on the assumption that information indicating a relatively inaccurate degree of traffic congestion is provided. In such a technology, a more accurate degree of traffic congestion can be determined by those who may acquire information indicating a relatively inaccurate degree of traffic congestion.

As an example of the present invention, a traffic congestion degree determination device is provided as follows. A map information acquiring unit is configured to acquire map information which includes speed limit information indicating a speed limit with respect to each of some of a plurality of road sections. A traffic information acquiring unit is configured to acquire, from an external traffic information providing center, traffic information which identifies a congested road section from among the road sections and a degree of traffic congestion relative to the congested road section, wherein the traffic information further sometimes includes average speed information indicating an average vehicle speed relative to the congest road section. A determining unit configured to determine a degree of traffic congestion with respect to the congested road section (i) based on the degree of traffic congestion identified by the acquired traffic information if the average speed information is not included in the acquired traffic information, (ii) based on the average speed information if the average speed information is included in the acquired traffic information and the speed limit information is not included in the acquired map data, and (iii) based on the average speed information and the speed limit information if the average speed information is included in the acquired traffic information and the speed limit information is included in the acquired map data.

As another example of the present invention, a traffic congestion degree notification device is provided to include the above traffic congestion degree determination device, a notifying unit for notifying a user of varied information, and a controlling unit. The control unit is for notifying the user of the degree of traffic congestion determined by the traffic congestion degree determination device through the notifying unit so that the degree of traffic congestion is recognized to correspond to the congested road section.

As another example of the present invention, a computer readable medium is provided to include a computer program comprising instructions for causing a computer to function as the above determining unit in the traffic congestion degree determination device.

BRIEF DESCRIPTION OF THE DRAWINGS

The above and other objects, features, and advantages of the present invention will become more apparent from the following detailed description made with reference to the accompanying drawings. In the drawings:

FIG. 3A is an explanatory drawing illustrating an example of a table indicating the correspondence between event location numbers and link numbers used in map data;

FIG. 3B is an explanatory drawing illustrating an example of a table indicating the correspondence between event numbers, event categories, and event level classifications;

FIG. 4A is an explanatory drawing illustrating an example of a table indicating the correspondence between (i) differences between average vehicle speeds and speed limits and (ii) degrees of traffic congestion; and FIG. 4B is an explanatory drawing illustrating an example of a table indicating the correspondence between (i) average vehicle speeds and (ii) degrees of traffic congestion.

DETAILED DESCRIPTION OF THE PREFERRED EMBODIMENTS

Hereafter, description will be given to an embodiment of the present invention with reference to the drawings.

(Description of Configuration of Automobile Navigation System)

Figure 1:
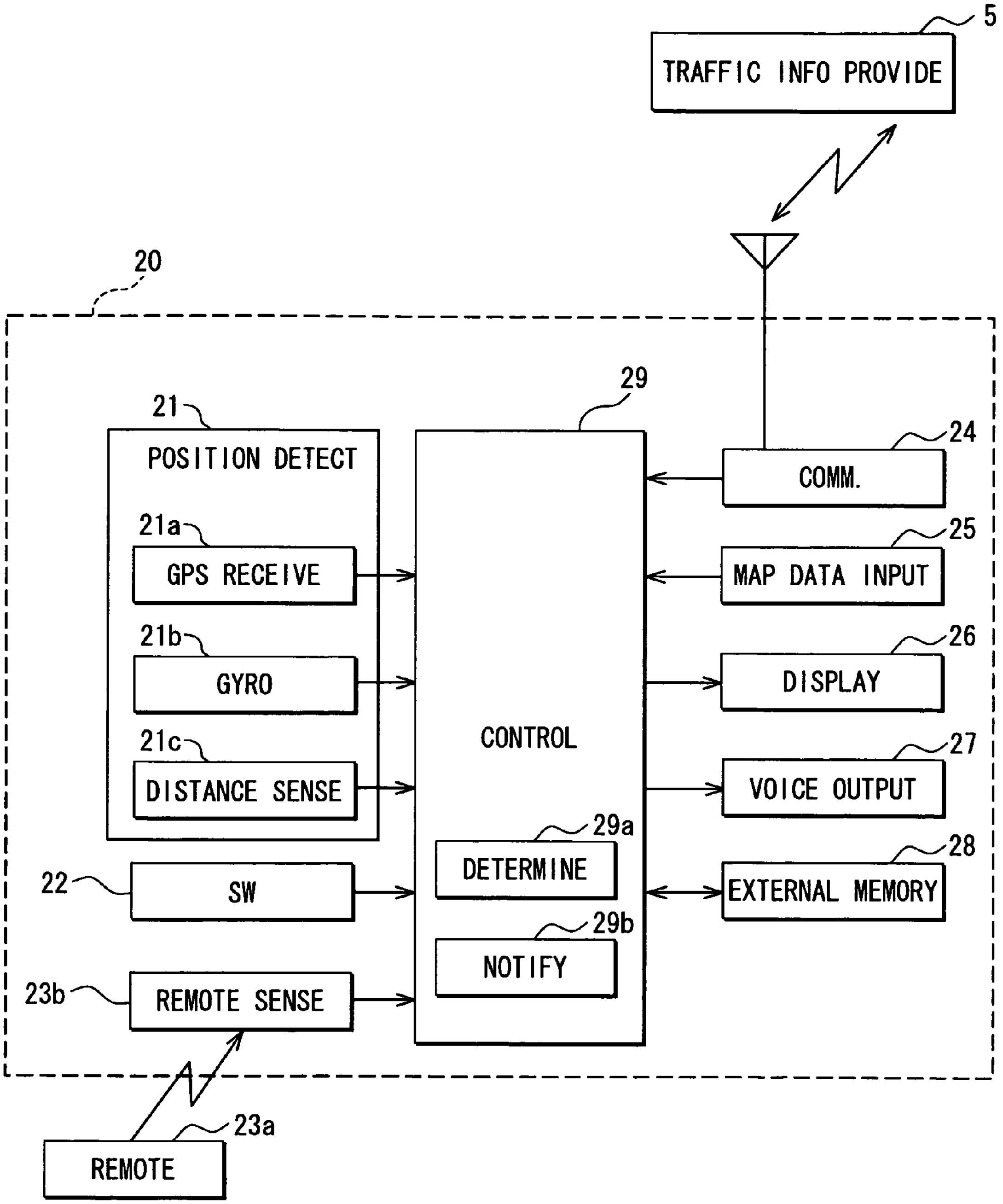
FIG. 1 is an explanatory drawing illustrating a general configuration of an automobile navigation system in an embodiment.

FIG. 1 is a block diagram illustrating the general configuration of an automobile navigation system 20 with functions of a traffic congestion degree determination device according the embodiment.

The automobile navigation system 20 is mounted in a subject vehicle, and includes: a position detector 21 that detects a current position, speed, traveling direction, and the like of the vehicle; an operation switch group 22 for inputting various instructions from a user; a remote control terminal (hereafter, referred to as "remote") 23*a* that is capable of inputting various instructions, just like the operation switch group 22; a remote sensor 23*b* that inputs signals from the remote 23*a*; an external communication unit 24 that communicates with an external traffic information providing center 5; a map data input device 25 for inputting map data and the like from external recording media with map data and varied information recorded thereon; a display unit 26 for displaying map display windows and the like; a voice output unit 27 for outputting various guiding voices and the like; an external memory 28 storing varied information; and a control circuit 29 connected with the foregoing devices or the like.

The position detector 21 includes: a GPS receiver 21*a* that receives radio waves transmitted from artificial satellites for GPS (Global Positioning System) through a GPS antenna and detects a current position, speed, traveling direction, and the like of the vehicle; a gyro scope 21*b* that detects a magnitude of rotational motion applied to the vehicle; and a distance sensor 21*c* for detecting a mileage the vehicle has traveled. The above-mentioned sensor and the like 21*a* to 21*c* have errors different in nature; therefore, they are so constructed that they are complemented by one another when used. Depending on accuracy, only some of the above-mentioned sensor and the like may be used, or a rotation sensor for steering, a wheel sensor for each wheel, and the like may be used.

The operation switch group 22 uses: a touch panel constructed integrally with the display unit 26 and installed over its screen surface; mechanical key switches provided around the display unit 26; and the like. The touch panel and the display unit 26 are integrally laminated. There are various types of touch panels, including pressure sensitive type, electromagnetic induction type, capacitance type, and combinations of them, and any type may be used.

The external communication unit 24 carries out information communication between it and an external traffic information providing center 5, and thereby receives traffic information distributed from the traffic information providing center 5 by FM multiple broadcasting, radio waves, optical beacons, or the like. Or, the external communication unit 24 may be so constructed that it receives traffic information from a traffic information providing center 5 through a telephone line network, such as the Internet.

The map data input device 25 is used to input varied data stored on a map data recording medium (e.g., hard disk, DVD-ROM, etc.) not shown. The map data recording medium stores map data, voice data for guidance, voice recognition data, and the like. Instead of inputting these data from a map data recording medium, these data may be inputted through a communication network. Here, the map data include node data, link data, cost data, background data, road data, name data, mark data, intersection data, and facility data. Further, the name data, mark data, intersection data, and facility data may be regarded as route-related data.

The display unit 26 is a color display unit, and any of liquid crystal display, plasma display, CRT, and the like may be used as the display unit 26. The display screen of the display unit 26 can show the following in superposition: a mark indicating the present location identified from the current position of the vehicle detected by the position detector 21 and map data inputted from the map data input device 25; a guided route to a destination; and additional data including names, landmarks, symbol marks for various facilities, and the like. In addition, as described later, a mark indicating traffic information can be displayed in correspondence with a guided route (FIG. 3A) or can be displayed in correspondence with place names (FIG. 3B). The voice output unit 27 can output voices for varied guidance, such as traveling guidance.

The control circuit 29 is configured based on a publicly known microcomputer constructed of CPU, ROM, RAM, I/O, bus lines connecting these elements, and the like. It carries out varied processes according to inputs from the above-mentioned position detector 21, operation switch group 22, remote sensor 23*b*, external communication unit 24, and map data input device 25. Then, it controls the external communication unit 24, display unit 26, and voice output unit 27. The control circuit 29 carries out varied processes according to a program stored in the ROM or the like, using data in the external memory 28 as required.

Examples of processes related to navigation include a map display process and a route guidance process. In the map display process, it computes the current position of the vehicle as a set of coordinates and a traveling direction based on various detection signals from the position detector 21. Then, it displays a map of an area in proximity to the current position, read through the map data input device 25, and the like on the display unit 26. In the route guidance process, it computes an optimum route from the current position to a destination based on (i) point data stored in the map data input device 25 and (ii) the destination set through the operation of the operation switch group 22, remote 23*a*, or the like. Then, it provides traveling guidance with respect to the computed route. Known techniques for automatically setting an optimum route include cost computation by the Dijkstra method and the like.

The control circuit 29 also carries out the traffic notification process in parallel with the above-mentioned map display process, route guidance process, and the like. The traffic notification process will be described in detail later. As mentioned above, the automobile navigation system 20 acquires traffic information from a traffic information providing center 5 through the external communication unit 24. Description will be given to this traffic information providing center 5.

The traffic information providing center 5 is connected with a radio base station capable of communicating with each vehicle, through a communication link. The traffic information providing center carries out radio communication with the automobile navigation system 20 through the radio base station and transmits or notifies traffic information to the automobile navigation system 20. Specifically, the traffic information providing center 5 includes: a traffic information database for storing traffic information to be transmitted to the automobile navigation system 20; a line terminal device that carries out communication through a communication link, and a server for managing data; and the like. (None of these items is shown in the drawing.)

As traffic information, the traffic information database contains information that makes it possible to identify a degree of traffic congestion and information that makes it possible to identify a relevant congested road section. It also contains information indicating an average vehicle speed with respect to at least some road sections. The traffic information transmitted from the traffic information providing center 5 is, for example, "Loc No 1001: Event No 1001: Slow traffic for 5 km with average speeds 40 km/h."

In this example, "Loc No 1001" is an event location number, which indicates the number of a location where an event has occurred. "Event No 1001" is an event number, which is the number of the event that has occurred. "Slow traffic for 5 km" is information indicating the details of the event, and this example indicates that slow traffic has taken place for five kilometers. Further, "with average speeds 40 km/h" indicates that the average vehicle speed is 40 km/h. Other examples of information indicating the details of an event include information indicating a degree of traffic congestion of heavy traffic or the like, traffic regulation information, and the like.

Hereafter, description will be given to the following process carried out in the automobile navigation system 20 in the present embodiment with reference to the flowchart in FIG. 2: traffic information is received, a degree of traffic congestion is determined, and this traffic congestion information is displayed on the display unit 26.

The process of identifying a link number from an event location number contained in received traffic information and the process of identifying a category from an event number are carried out. In these processes, the correspondence tables illustrated in FIGS. 3A and 3B are used. To determine a degree of traffic congestion, the correspondence tables illustrated in FIGS. 4A and 4B are used. These tables are stored in the external memory 28. The details of the contents of the tables will be described below when the above process is described with reference to the flowchart.

(Description of Process of Displaying Traffic Information)

Figure 2:
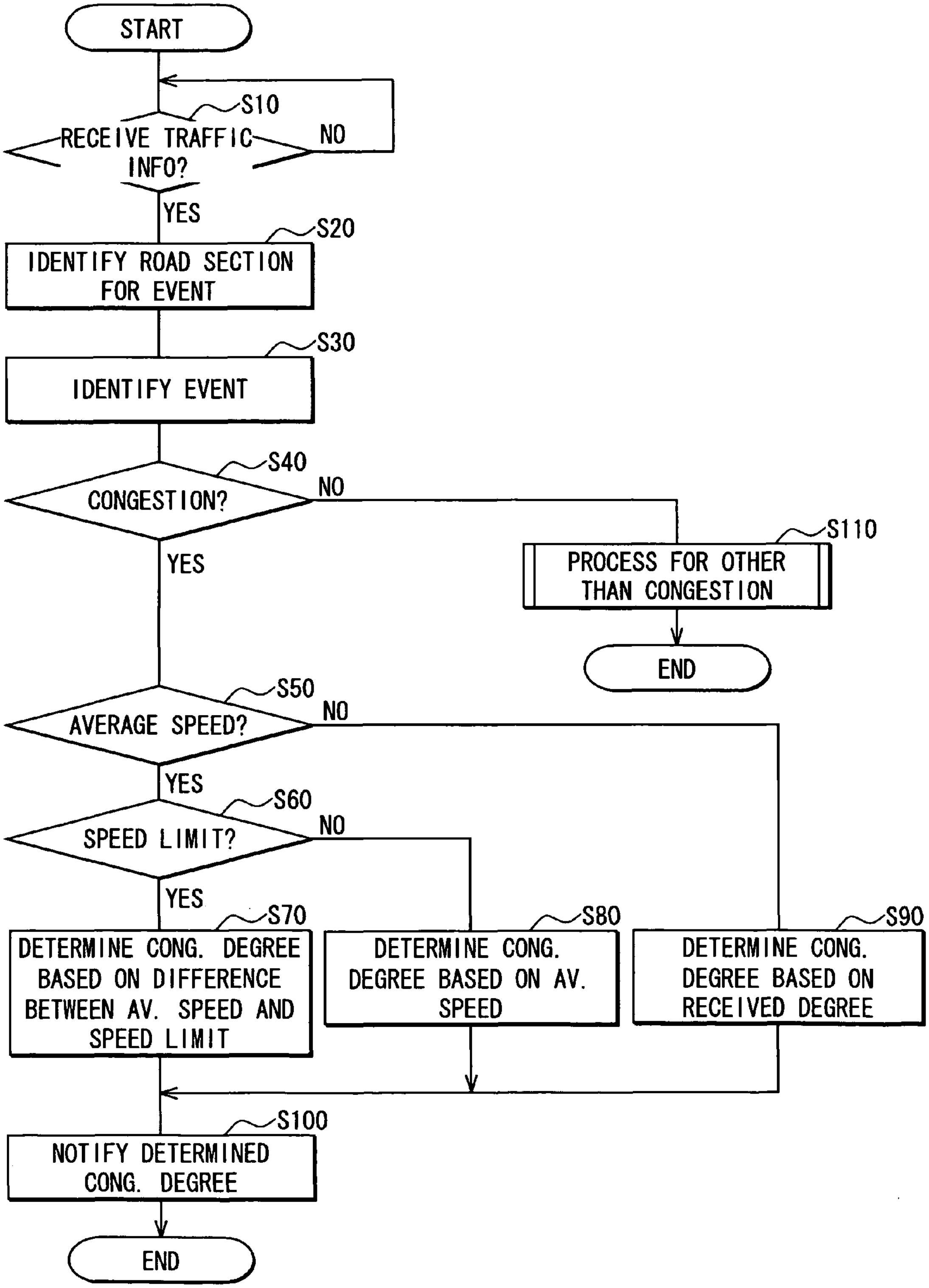
FIG. 2 is a flowchart illustrating a process of displaying traffic information.

FIG. 2 is a flowchart illustrating the flow of the process of displaying traffic information carried out by the control circuit 29 of the automobile navigation system 20.

This traffic information display process is carried out on the following occasions: when the area displayed as traffic congestion information is changed, at certain time intervals (e.g. one minute), immediately before route search is carried out, and the like.

It is determined whether or not traffic information has been received from a traffic information providing center 5 at Step 10 (Step is hereafter simply represented by S). When traffic information has been received (S10: YES), the flow proceeds to S20.

At S20, a road section where an even has occurred is identified based on the received traffic information. Hereafter, specific description will be given as required on the assumption that the following traffic information is received from the traffic information providing center 5: "Loc No 1000: Event No 1001: Slow traffic for 5 km with average speeds 40 km/h."

In such an example, at S20, the road section is identified based on the event location number "Loc No 1000" in the received traffic information. Specifically, the correspondence table illustrated in FIG. 3A is used. This correspondence table indicates the correspondence between event location numbers and link numbers used in map data. Use of this correspondence table makes it possible to identify the link number of a link where an event has occurred.

At S30, subsequently, the details and category of the event are identified based on the received traffic information. In the above example of traffic information, these items are identified based on the event number "Event No 1001" in the traffic information. Specifically, the correspondence table illustrated in FIG. 3B is used. This correspondence table indicates the correspondence between event numbers, event categories, and event level classifications. The event number 1001 indicates the level of "slow traffic" of an event belonging to the category of "degree of traffic congestion."

At S40, subsequently, it is determined whether or not the event category identified at S30 is degree of traffic congestion. When the category is degree of traffic congestion (S40: YES), the flow proceeds to S50. When the category is not degree of traffic congestion (S40: NO), the flow proceeds to S110 and the process corresponding to the category is carried out. Detailed description of this process will be omitted.

At S50, it is determined whether or not data indicating an average vehicle speed is contained in the received traffic information. When data indicating an average vehicle speed, or "average speeds 40 km/h" is present as in the above example of traffic information (S50: YES), the flow proceeds to S60.

At S60, it is determined whether or not speed limit data corresponding to the road section where the event has occurred is contained in map data. The map data contains data about speed limits in correspondence with at least some link data. This is because the following cases are possible depending on the circumstances in which the map data is produced: cases where with respect to major roads, speed limit data is also created in correspondence therewith but with respect to minor roads, speed limit data is not brought into correspondence therewith. At S60, therefore, it is determined whether or not speed limit data corresponding to the road section (link) where the event has occurred identified at S20 is contained in the map data.

When speed limit data is present (S60: YES), the flow proceeds to S70 and a degree of traffic congestion is determined based on the difference between the average vehicle speed and the speed limit. Specifically, this determination is carried out using the correspondence table illustrated in FIG. 4A. This correspondence table indicates the correspondence between (i) the differences between average vehicle speeds and speed limits and (ii) degrees of traffic congestion. In the example illustrated in FIG. 4A, the roads are classified into two different types, highway and ordinary road. As degree of traffic congestion, three different levels, "heavy traffic," "slow traffic," and "no congestion," are set, and the differences between average vehicle speeds and speed limits are set in one-to-one correspondence with these levels.

For highways, the determination is carried out as follows: when the difference is not less than A1 km/h, the degree of traffic congestion is determined as heavy traffic; when the difference is B1 km/h to A1 km/h, the degree of traffic congestion is determined as slow traffic; and when the difference is less than B1 km/h, the degree of traffic congestion is determined as no congestion. For ordinary roads, the determination is carried out as follows: when the difference is not less than A2 km/h, the degree of traffic congestion is determined as heavy traffic; when the difference is B2 km/h to A2 km/h, the degree of traffic congestion is determined as slow traffic; and when the difference is less than B2 km/h, the degree of traffic congestion is determined as no congestion.

In the example illustrated in FIG. 4A, the roads are classified into two different types, highway and ordinary road. Instead, they may be classified into three or more different types or they may be grouped together for the sake of simplicity.

When speed limit data is not present (S60: NO), the flow proceeds to S80 and a degree of traffic congestion is determined based on the average vehicle speed. Specifically, the determination is carried out using the correspondence table illustrated in FIG. 4B. This correspondence table indicates the correspondence between average vehicle speeds and degrees of traffic congestion. In the example illustrated in FIG. 4B, the roads are classified into two different types, highway and ordinary road. As degree of traffic congestion, three levels, "heavy traffic," "slow traffic," and "no congestion," are set, and average vehicle speeds are set in one-to-one correspondence with these levels.

For highways, the determination is carried out as follows: when the average vehicle speed is 0 km/h to α1 km/h, the degree of traffic congestion is determined as heavy traffic; when the average vehicle speed is α1 km/h to β1 km/h, the degree of traffic congestion is determined as slow traffic; and when the average vehicle speed is not less than β1 km/h, the degree of traffic congestion is determined as no congestion. For ordinary roads, the determination is carried out as follows: when the average vehicle speed is 0 km/h to α2 km/h, the degree of traffic congestion is determined as heavy traffic; when the average vehicle speed is α2 km/h to β2 km/h, the degree of traffic congestion is determined as slow traffic; and when the average vehicle speed is not less than β2 km/h, the degree of traffic congestion is determined as no congestion.

In the example illustrated in FIG. 4B, the roads are classified into two different types, highway and ordinary road. Instead, they may be classified into three or more different types.

When a negative determination is made at S50, that is, when average vehicle speed data itself does not exist in the received traffic information (S50: NO), the flow proceeds to S90 and a degree of traffic congestion is determined based on the level of traffic congestion contained in the received traffic information. In the above example of traffic information, that is, the level of traffic congestion of "slow traffic" is directly taken as the result of determination of degree of traffic congestion.

After the determination made at S70, S80, or S90, the flow proceeds to S100 and traffic congestion information is displayed. As the method for displaying this traffic congestion information, various conventionally known methods can be used. For example, the relevant road section in the map can be indicated in a color corresponding to the degree of traffic congestion or the traffic congestion information can be represented by characters.

(Effect of the Embodiment)

In the automobile navigation system 20 in this embodiment, a degree of traffic congestion is determined as follows based on traffic information received from a traffic information providing center 5:

(1) When an average vehicle speed corresponding to a congested road section exists (S50: YES) and at the same time, speed limit data corresponding to the congested road section is contained in map data (S60: YES), the following process is carried out: a degree of traffic congestion is determined based on the difference between the average vehicle speed and the speed limit (S70).

(2) When an average vehicle speed corresponding to a congested road section exists (S50: YES) but speed limit data corresponding to the congested road section is not contained in map data (S60: NO), the following process is carried out: a degree of traffic congestion is determined based on the average vehicle speed (S80).

(3) When there is not information indicating an average vehicle speed corresponding to a congested road section (S50: NO), the level of traffic congestion in the received traffic information is directly taken as the result of determination of degree of traffic congestion (S90).

When accurate traffic congestion information is provided from a traffic information providing center 5, that information can be directly used to determine a degree of traffic congestion. When only relatively inaccurate traffic congestion information is provided from a traffic information providing center 5, it is inappropriate to directly use that information to determine a degree of traffic congestion. More specific description will be given. It will be assumed that information indicating a degree of traffic congestion (e.g., "heavy traffic," "slow traffic," "no congestion") is provided from a traffic information providing center 5. In this case, this information may disagree with the actual condition because someone's judgment is mixed in in the process of determination of the degree of traffic congestion or for any other reason. For example, even when a degree of traffic congestion of "slow traffic" is acquired, the road may be in "no congestion" state in actuality.

With respect to average vehicle speed, there is a low possibility that someone's judgment is mixed in the process of determination of it, and it can be said that average vehicle speed is relatively reliable information.

In this embodiment, consequently, a degree of traffic congestion is determined in the above-mentioned three patterns (1) to (3). As is apparent from the foregoing, the following process is carried out when a degree of traffic congestion is determined based on traffic information acquired from a traffic information providing center 5: when there is information indicating an average vehicle speed corresponding to a congested road section, this determination is carried out based on the average vehicle speed even though information that makes it possible to identify a degree of traffic congestion is included in the traffic information. For this reason, even in an environment in which information indicating a relatively inaccurate degree of traffic congestion is provided, a more accurate degree of traffic congestion can be determined on the part of those who acquire information indicating the degree of traffic congestion.

However, there may be cases where the same average vehicle speed is evaluated as no congestion for an ordinary road and as slow traffic for a highway. To cope with this, the following measure is taken: a degree of traffic congestion is determined based on the correspondence between average vehicle speeds and degrees of traffic congestion, corresponding to the road category of the road section as the object of determination. Thus, a degree of traffic congestion can be appropriately determined in accordance with the road category.

(Functions)

In the above embodiment, the map data input device 25 may include or function as a map information acquiring means or unit, and the external communication unit 24 may include or function as a traffic information acquiring means or unit. The external memory 28 may include or function as a storing means or unit. The display unit 26 or voice output unit 27 may include or function as a notifying means or unit.

(Modifications)

Up to this point, description has been given to an embodiment of the invention. How the invention is embodied is not limited to the above embodiment, and the invention can be embodied in various modes without departing from the technical scope of the invention.

(a) In the above embodiment, the degree of traffic congestion is classified into three levels, "heavy traffic," "slow traffic," and "no congestion." This is just an example, and it may be classified into more levels.

(b) In the above embodiment, information indicating a degree of traffic congestion is notified to a user by displaying it on the display unit 26. Instead, it may be notified by voice through the voice output unit 27. Needless to add, both may be used together.

(c) In the description of the above embodiment, a case where the functions of a traffic congestion degree determination device or a traffic congestion degree notification device are incorporated into the automobile navigation system 20 mounted in a vehicle is taken as an example. Instead, these functions may be incorporated into, for example, a so-called mobile navigation device that is portable. Or, these functions may be incorporated into a terminal, such as a cellular phone, carried by a human. Further, the functions may be incorporated into, for example, a personal computer.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer. For instance, the control circuit 29 may function as a determining means or unit 29*a* in the flowchart of FIG. 2 (also see FIG. 1) and as a notification controlling means or unit 29*b* for notifying varied information at S100 in the flowchart of FIG. 2 (also see FIG. 1).

Furthermore, the software unit or any combinations of multiple software units can be included in a software program, which can be contained in a computer-readable storage media or can be downloaded and installed in a computer via a communications network.

(Aspects of Disclosure)

Aspects of the disclosure described herein are set out in the following clauses.

As an aspect, a traffic congestion degree determination device is includes: a map information acquiring means for acquiring map information; a traffic information acquiring means for acquiring traffic information from an external traffic information providing center; and a determining means for determining a degree of traffic congestion based on map information acquired by the map information acquiring means and traffic information acquired by the traffic information acquiring means.

The map information includes information indicating a speed limit with respect to at least some road sections. The traffic information acquired from the traffic information providing center includes information that makes it possible to identify a degree of traffic congestion and information that makes it possible to identify a congested road section. In addition, it includes information indicating an average vehicle speed with respect to at least some road sections.

The determining means determines a degree of traffic congestion on a case-by-case basis as follows:

Case (1) There is information indicating an average vehicle speed corresponding to a congested road section identified by information that makes it possible to identify a congested road section and at the same time there is information indicating a speed limit corresponding to the congested road section.

In such a case, the determining means determines a degree of traffic congestion based on the average vehicle speed and the speed limit.

Case (2) There is information indicating an average vehicle speed corresponding to a congested road section but there is not information indicating a speed limit corresponding to the congested road section.

In such a case, the determining means determines a degree of traffic congestion based on the average vehicle speed.

Case (3) There is not information indicating an average vehicle speed corresponding to a congested road section.

In such a case, the determining means determines a degree of traffic congestion based on a degree of traffic congestion identified by information that makes it possible to identify a degree of traffic congestion.

The assumption on which the disclosure is based will be reaffirmed. When accurate traffic congestion information is provided, that information can be acquired and provided to a user. The assumption on which the disclosure is based is a situation in which only relatively inaccurate traffic congestion information is provided from external traffic information providing centers. As an example, it will be assumed that information indicating a degree of traffic congestion, “heavy traffic,” “low traffic,” and “no congestion” is provided. In this case, an acquired degree of traffic congestion may disagree with the actual condition because someone’s judgment was mixed in the process of determination of the degree of traffic congestion or for any other reason. For example, even when a degree of traffic congestion of “slow traffic” is acquired, the road may be in “no congestion” state in actuality.

With respect to average vehicle speeds, there is a low possibility that someone’s judgment is mixed in the process of the determination of it, and it can be said that an average vehicle speed is relatively reliable information. The traffic congestion degree determination device determines a degree of traffic congestion in the above-mentioned three cases (1) to (3). As is apparent from the foregoing, this device performs the following operation when it determines a degree of traffic congestion based on traffic information acquired from a traffic information providing center: when there is information indicating an average vehicle speed corresponding to a congested road section, it makes this determination based on the average vehicle speed even though information that makes it possible to identify a degree of traffic congestion is included in traffic information. For this reason, even in an environment in which information indicating a relatively inaccurate degree of traffic congestion is provided, a more accurate degree of traffic congestion can be determined by those who acquire information indicating the degree of traffic congestion.

With respect to the determination of a degree of traffic congestion described under case (2) above, the following measure may be taken: the correspondence between average vehicle speeds and degrees of traffic congestion is stored; and a degree of traffic congestion is determined based on the correspondence between the average vehicle speeds and degrees of traffic congestion.

However, there may be cases where the same average vehicle speed is evaluated as no congestion for an ordinary road and as slow traffic for a highway. To cope with this, the following measure is taken: information indicating road category is included in map information; and the correspondence between average vehicle speeds and degrees of traffic congestion is stored on a road category-by-road category basis. The degree of traffic congestion in a road section is determined based on the correspondence between average vehicle speeds and degrees of traffic congestion corresponding to the road category of that road section. Thus, a degree of traffic congestion can be appropriately determined in accordance with the road category.

The results of determination by the above-mentioned traffic congestion degree determination device can be used for various purposes. A possible typical application is use in a traffic congestion degree notification device as another aspect. A more specific description will be given. A notifying means and notification controlling means are provided for notifying a user of the determined degree of traffic congestion. A degree of traffic congestion determined by the traffic congestion degree determination device is notified to the user by the notifying means and the notification controlling means so that the user can recognize a corresponding road section.

Such a traffic congestion degree notification device can be realized as, for example, an in-vehicle unit. Specifically, it can be applied as a function of an automobile navigation system.

To implement the functions of the determining means of the traffic congestion degree determination device described up to this point in a computer system, they can be implemented as a program running on the computer system as yet another aspect. The functions of each function mentioned above can be implemented by recording such a program on a computer-readable recording medium, such as magneto-optical disk, CD-ROM, DVD-ROM, hard disk, ROM, RAM, and the like, and loading it to a computer as required.

It will be obvious to those skilled in the art that various changes may be made in the above-described embodiments of the present invention. However, the scope of the present invention should be determined by the following claims.

What is claimed is:

1. A traffic congestion degree determination device in a vehicle, the device comprising:

a map data input device configured to provide map data which includes speed limit information indicating a speed limit with respect to each of at least one of a plurality of road sections;

an external communication unit configured to acquire, from an external traffic information providing center, traffic information which identifies a congested road section from among the road sections and a degree of traffic congestion relative to the congested road section, wherein the traffic information further includes average speed information indicating an average vehicle speed relative to the congested road section; and a control circuit configured to determine whether average speed information indicating an average speed with respect to the congested road section is contained in the traffic information acquired from the external traffic information providing center, the control circuit being further configured to include a first determination unit configured to determine a degree of traffic congestion with respect to the congested road section based on the degree of traffic congestion identified by the traffic information acquired from the external traffic information providing center when the average speed information is determined not to be included in the acquired traffic information, a second determination unit configured to determine the degree of traffic congestion with respect to the congested road section based on the average speed information when the average speed information is determined to be included in the traffic information acquired from the external traffic information providing center and the speed limit information is not acquired within the vehicle from the map data provided by the map data input device, and a third determination unit configured to determine the degree of traffic congestion with respect to the congested road section based on the average speed information and the speed limit information when the average speed information is determined to be included in the traffic information acquired from the external traffic information providing center and the speed limit information is acquired within the vehicle from the map data provided by the map data input device.

2. The traffic congestion degree determination device according to claim 1, comprising:

a storing unit for storing a correspondence between average vehicle speeds and degrees of traffic congestion, wherein, with respect to the congested road section, if the average speed information is included in the acquired traffic information and the speed limit information is not included in the acquired map data, the second determining unit determines the degree of traffic congestion based on the correspondence between average vehicle speeds and degrees of traffic congestion stored in the storing unit.

3. The traffic congestion degree determination device according to claim 2, wherein the map data includes road category information individually indicating road categories of the road sections, wherein the storing unit stores the correspondence between average vehicle speeds and degrees of traffic congestion with respect to each of the road categories, and wherein, with respect to the congested road section, if the average speed information is included in the acquired traffic information and the speed limit information is not included in the acquired map data, the second determining unit determines the degree of traffic congestion based on the correspondence between average vehicle speeds and degrees of traffic congestion with respect to a road category of the congested road section.

4. A traffic congestion degree notification device in a vehicle, the device comprising:

the traffic congestion degree determination device according to claim 1;

a notifying unit for notifying a user of varied information; and a notification controlling unit for notifying the user of the degree of traffic congestion determined by the traffic congestion degree determination device through the notifying unit so that the degree of traffic congestion is recognized to correspond to the congested road section.

5. A non-transitory computer readable medium including a computer program comprising instructions for causing a computer to function as the determining unit in the traffic congestion degree determination device according to claim 1.

6. The traffic congestion degree notification device according to claim 4, the notifying unit being further configured to notify the user of the varied information along a guided route; and the notification controlling unit being further configured to notify, along the guided route, the user of the degree of traffic congestion determined by the traffic congestion degree determination device through the notifying unit so that the degree of traffic congestion is recognized to correspond to the congested road section.

7. A method of determining in a vehicle a degree of traffic congestion, the method comprising:

acquiring, from an external traffic information providing center, traffic information which identifies a congested road section from among a plurality of road sections and a degree of traffic congestion relative to the congested road section;

acquiring, average speed information indicating an average speed with respect to the congested road section, when the average speed information is available;

determining whether average speed information indicating an average speed with respect to the congested road section is contained in the traffic information acquired from the external traffic information providing center;

determining a degree of traffic congestion with respect to the congested road section based on the degree of traffic congestion identified by the traffic information acquired from the external traffic information providing center when it is determined that the average speed information is not contained in the acquired traffic information;

acquiring, in the traffic congestion degree determining device within the vehicle, speed limit information indicating a speed limit with respect to the congested road section, when it is determined that the average speed information is contained in the traffic information acquired from the external traffic information providing center;

determining, in the traffic congestion degree determining device, a degree of traffic congestion with respect to the congested road section based on the average speed information when the average speed information is acquired from the external traffic information providing center and the speed limit information is not acquired within the vehicle, and determining, in the traffic congestion degree determining device, a degree of traffic congestion with respect to the congested road section based on the average speed information and the speed limit information when the average speed information is acquired from the external traffic information providing center and the speed limit information is acquired within the vehicle.

* * * * *